(12) United States Patent
Gallimore

(10) Patent No.: US 9,016,048 B2
(45) Date of Patent: Apr. 28, 2015

(54) EXHAUST ARRANGEMENT

(71) Applicant: ROLLS-ROYCE plc, London (GB)

(72) Inventor: Stephen Gallimore, Lincoln (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 14/030,376

(22) Filed: Sep. 18, 2013

(65) Prior Publication Data

US 2014/0096518 A1 Apr. 10, 2014

(30) Foreign Application Priority Data

Oct. 8, 2012 (GB) .................................. 1217944.6

(51) Int. Cl.
| | |
|---|---|
| *F01N 3/00* | (2006.01) |
| *F02B 37/02* | (2006.01) |
| *F01N 5/00* | (2006.01) |
| *F01N 5/02* | (2006.01) |
| *F01N 5/04* | (2006.01) |

(52) U.S. Cl.
CPC . *F02B 37/02* (2013.01); *F01N 5/00* (2013.01); *F01N 5/025* (2013.01); *F01N 5/04* (2013.01); *F01N 2410/00* (2013.01); *Y02T 10/16* (2013.01); *Y02T 10/166* (2013.01)

(58) Field of Classification Search
USPC .......... 60/272, 287, 288, 289, 298, 320, 321, 60/324; 165/51, 52
See application file for complete search history.

(56) References Cited

U.S. PATENT DOCUMENTS

| 4,161,931 | A | * | 7/1979 | Giardini et al. ............... 123/552 |
|---|---|---|---|---|
| 5,130,099 | A | * | 7/1992 | Schatz ......................... 422/175 |
| 5,642,614 | A | | 7/1997 | Bozzuto et al. |
| 6,155,042 | A | * | 12/2000 | Perset et al. .................... 60/278 |
| 6,568,179 | B2 | * | 5/2003 | Deeba ............................. 60/298 |
| 6,708,485 | B2 | * | 3/2004 | Hinder et al. .................. 60/288 |
| 6,973,771 | B2 | | 12/2005 | Nottin |
| 8,297,049 | B2 | * | 10/2012 | Ohtani ........................... 60/317 |
| 8,327,634 | B2 | * | 12/2012 | Orihashi et al. ............... 60/320 |
| 2003/0136102 | A1 | | 7/2003 | Nottin |

FOREIGN PATENT DOCUMENTS

| EP | 1 329 595 A1 | 7/2003 |
|---|---|---|
| EP | 1 852 585 A1 | 11/2007 |
| FR | 2 296 759 A1 | 7/1976 |
| WO | WO 2011/107282 A1 | 9/2011 |

OTHER PUBLICATIONS

Search Report issued in European Application No. 13 18 4875 issued Feb. 25, 2014.
Search Report issued in British Application No. 1217944.6 dated Jan. 22, 2013.

* cited by examiner

*Primary Examiner* — Binh Q Tran
(74) *Attorney, Agent, or Firm* — Oliff PLC

(57) ABSTRACT

An exhaust arrangement for an internal combustion engine. The exhaust arrangement includes a diffuser duct including a wall surface which diverges between an inlet and a first outlet. The arrangement further includes an auxiliary duct extending from a second outlet of the diffuser duct. The second diffuser duct outlet being located on the wall surface between the diffuser duct inlet and the first outlet. The auxiliary duct includes a heat recovery device configured to convert heat energy from exhaust gases passing through the auxiliary duct in use to mechanical or electrical energy.

14 Claims, 1 Drawing Sheet

EXHAUST ARRANGEMENT

The present invention relates to an exhaust arrangement for an internal combustion engine, and a power generator comprising the exhaust arrangement and an internal combustion engine.

Internal combustion engines such as piston engines or gas turbine engines generate power by burning fuel with air in a cylinder (in the case of piston engines) or a combustor (in the case of gas turbine engines). Energy is extracted from the hot exhaust gases by expansion against a piston (in the case of piston engines) or one or more turbines (in the case of a gas turbine engine). The exhaust gases are then exhausted to the atmosphere through an exhaust arrangement.

However, the exhaust gases entering the exhaust arrangement will still generally have a higher temperature compared to ambient atmospheric temperature, since not all of the heat generated by burning the fuel will be converted to mechanical energy by the piston or turbine.

Further energy from the hot exhaust gases can therefore be converted to either mechanical or electrical energy by a heat recovery device. Examples of heat recovery devices include thermoelectric generators, organic Rankine cycle generators (ORC's) and heat recovery steam generators (HRSGs). Thermoelectric generators convert some of the heat remaining in the exhaust gases directly into electrical energy using the Seebeck effect, while ORC's and HRSGs utilise heat exchangers in thermal contact with the hot exhaust gases to heat water into steam, which is then used to drive a heat engine such as a steam turbine.

In conventional exhaust systems, the heat recovery device is placed in the path of the exhaust gas flow in the exhaust duct. Such an arrangement impedes the flow of gas through the exhaust duct, thereby increasing the back pressure provided by the exhaust system. As a result, though the heat recovery arrangement improves the overall efficiency of the system (i.e. the combined thermal efficiency of the internal combustion system and the heat recovery system), the heat recovery system itself will reduce the efficiency of the internal combustion engine, and thus the overall improvement in efficiency may be relatively small. Conventional heat recovery systems which are placed in the path of the exhaust gases in the exhaust duct are also generally very large, and have a high weight, and are therefore often unsuitable for use in vehicles.

The pressure available in the exhaust to drive a heat recovery system can be increased with the use of a diffuser. A diffuser comprises a duct having a cross section which diverges from an inlet to an outlet such that a fluid flowing through the diffuser from the inlet to the outlet is decelerated, and the pressure is increased. However, there is a limit to the extent to which the pressure can be increased by a conventional diffuser over a given length, since an excessive divergence angle, say, greater than 7° to 10° may lead to separation of the airflow from the diverging duct wall. Such flow separation would lead to drag losses in the duct, and therefore a reduction in efficiency. Conventional diffusers are therefore relatively long, which can be problematic for applications where space is limited (for example in ships).

In one previous example, a diffuser having a length/height ratio (i.e. the ratio between the distance between the inlet and the outlet, and the cross sectional area of the inlet) of 8 would be able to achieve an area ratio (i.e. the ratio between the cross sectional area at the inlet and the cross sectional area at the outlet) of about 2 with a diffuser angle of 6°. In a further example, a diffuser having a length/height ratio of 4 would achieve an area ratio of about 1.6 with a diffuser angle of about 8°.

The present invention provides an exhaust arrangement and a power generator that seeks to overcome some or all of the above problems.

According to a first aspect of the present invention there is provided an exhaust arrangement for an internal combustion engine, the exhaust arrangement comprising:
  a diffuser duct comprising a wall surface having a divergent portion, the arrangement further comprising:
  an auxiliary duct having an inlet extending from a second outlet of the diffuser duct, the second outlet being located on the wall surface of the divergent portion, wherein
  the auxiliary duct comprises a heat recovery device configured to convert heat energy from exhaust gases passing through the auxiliary duct in use to mechanical or electrical energy.

By providing a heat recovery device in an auxiliary duct which extends from a second outlet of the diffuser duct located in the diffuser portion, exhaust gas can be bled off through the auxiliary duct, which can then be used to convert some of the waste heat in the exhaust to mechanical or electrical energy. The exhaust arrangement can therefore recover some of the waste heat of the exhaust gases without substantially increasing the back pressure, and may reduce the back pressure, thereby maintaining or improving the performance of the internal combustion engine. As a further benefit, the divergence angle of the diffuser duct can be increased without encountering flow separation, thereby leading to a shorter length diffuser duct in comparison to prior arrangements.

The auxiliary duct may be arranged such that, when a fluid flows through the auxiliary duct in use, the fluid entering the auxiliary duct inlet is drawn from the boundary layer flow adjacent the diffuser duct wall. By drawing in boundary layer air from the diffuser duct, the auxiliary duct prevents flow separation adjacent the diffuser duct wall, thereby facilitating a higher pressure increase along the diffuser, and therefore more efficient operation of the diffuser. The term "boundary layer" will be understood to refer to the layer of air on a surface in contact with a moving fluid and may be defined as the portion of the flow near to the surface with a speed that is below 99% of the speed of an equivalent inviscid flow at the same location and conditions. When the velocity of the flow is above 99% of the inviscid case (e.g. almost unchanged) the flow is considered to be outside the boundary layer. Generally, thickness of the boundary layer increases proportionally to the length of the surface it is flowing onto, as it is slowing down due to friction effects.

The auxiliary duct inlet may be located at a position on the diffuser duct such that, in use, the pressure at the auxiliary duct inlet is above a required pressure, which may be atmospheric pressure. The auxiliary duct is thereby driven by the pressure gradient between the auxiliary duct inlet and the auxiliary duct outlet (which will generally be at atmospheric pressure), such that active pumping of fluid through the auxiliary duct is not required.

The auxiliary duct may comprise an outlet, which may vent directly to the atmosphere, or may communicate with a manifold which communicates with the first outlet of the diffuser duct.

The diffuser duct may comprise an upstream part and a downstream part divided by the second outlet, wherein the downstream part may have a step displacement away from a projected profile of the upstream part of the diverging wall surface.

As mentioned above, the thickness of the boundary layer increases proportionally to the length of the surface it is flowing onto, as it is slowing down due to friction effects. The step displacement may therefore permit the boundary layer air flowing through the diffuser portion in use to reattach to the wall surface at the downstream part after the boundary layer has been removed by the auxiliary duct, thereby further preventing flow separation.

Furthermore, as some of the flow is bled off through the second outlet, the flow through the downstream part is reduced thereby enabling either additional pressure recovery, or a reduction in dimensions. If say 10% of the flow could be bled off through the second outlet, this would achieve the equivalent of an 11% increase in area ratio even if the first outlet is the same dimension.

Each of the upstream and downstream portions of the duct may have a length/height ratio of approximately 4. Each of the upstream and downstream portions may have a divergence angle of between 6° and 10°, and preferably have a divergence angle of approximately 8°. The overall area ratio of the diffuser duct from the first inlet to the first outlet may be approximately 2.7.

The heat recovery device may comprise a Seebeck effect heat recovery device. Alternatively, the heat recovery device may comprise a heat recovery steam generator (HRSG), or an organic Rankine cycle (ORC) generator.

According to a second aspect of the invention there is provided a power generator comprising an internal combustion engine and an exhaust arrangement in accordance with the first aspect of the invention.

The present invention will be more fully described by way of example with reference to the accompanying drawings, in which.

Figure 1:
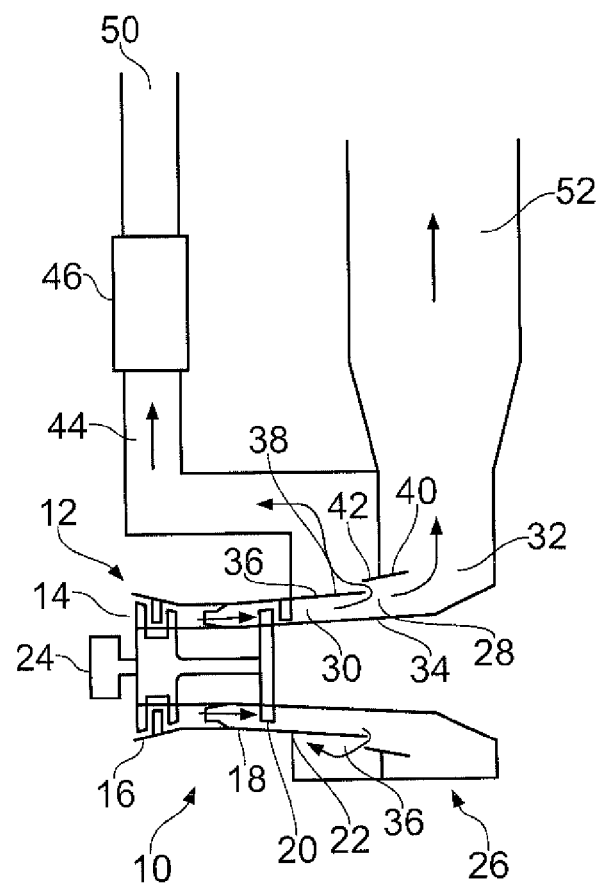
FIG. 1 is a cross sectional view of a first power generator.

FIG. 1 shows a first power generator 10. The power generator 10 comprises an internal combustion engine in the form of a gas turbine engine 12, and an exhaust arrangement 26.

The gas turbine engine 12 comprises, in axial flow series, an intake 14, compressor 16, combustor 18, turbine 20 and exhaust nozzle 22. In use, air flows in though the intake 14 and is compressed by the compressor 16. Fuel is burned with the compressed air in the combustor 18. The resultant hot exhaust gases are then expanded through the turbine 20, which is turned by the gases, thereby converting some of the thermal energy in the exhaust gases to mechanical energy. This mechanical energy is used to drive the compressor 16, as well as a load such as an electrical generator 24. The exhaust gases then exit the gas turbine engine 12 through the exhaust nozzle 22.

Once the hot gases have exited the nozzle 22, they flow into the exhaust arrangement 26. The exhaust arrangement 26 comprises a diffuser duct 28 having an inlet 30 adjacent the exhaust nozzle 22 into which the exhaust gases flow, and a first outlet 32. The diffuser duct 28 is defined between a radially inner wall surface comprising a generally frustoconical exhaust plug 34, and a radially outer wall surface comprising an outwardly diverging outer casing 36 which surrounds the exhaust plug 34. The diffuser duct 28 is therefore generally annular, and diverges from a first area at the inlet 30, to a second, greater area at the first outlet 32.

The outer casing 36 comprises upstream 38 and downstream 40 portions. The upstream portion 38 extends from the inlet 30 to a second outlet 42 comprising an aperture located on the outer casing 36, spaced from the inlet 30. The downstream portion 40 extends from the second outlet 42 to the first outlet 32. The second outlet 42 defines a step displacement between the upstream 38 and downstream 40 portions, such that the downstream portion has a step displacement radially outwardly from a projected profile of the upstream part of the casing 36. In other words, the outer casing 36 is non-continuous, and the upstream and downstream portions 38, 40 are separated by a radial gap. The downstream portion 40 therefore defines a leading edge located radially outwardly of a trailing edge defined by the upstream portion 38. Each of the upstream 38 and downstream 40 portions have substantially similar divergence angles of approximately 8° in this embodiment. Generally, divergence angles of between 6° and 10° can be achieved in both the upstream and downstream portions.

The exhaust arrangement further comprises an auxiliary duct 44, which comprises an inlet extending from the second outlet 42 of the diffuser duct 28. The auxiliary duct 44 includes a heat recovery device 46 located part way thereal-ong for converting thermal energy from exhaust gases flowing through the auxiliary duct 44 in the direction shown by the arrows in FIG. 1 to either mechanical or electrical energy. The heat recovery device 46 could be of any suitable type, including for example a Seebeck effect heat recovery device, a heat recovery steam generator (HRSG), or a turbine such as an ORC turbine.

In use, exhaust air from the gas turbine engine 12 flows out through the exhaust nozzle 22 into the inlet 30 of the exhaust arrangement 26. The exhaust gases then flow in the direction shown by the arrows in FIG. 1 along the upstream portion 38 toward the second outlet 42. A portion of the exhaust gases flows in a "boundary layer" adjacent the outer casing 36, with the remainder flowing through the remainder of the duct 28. As the exhaust gases flow toward the second outlet 42, the pressure of the exhaust gases relative to the pressure at the inlet 30 is increased as a result of the diverging profile of the diffuser duct 28.

As the exhaust gases reach the second outlet 42, the exhaust gases are pressurised to an above atmospheric pressure, such that a portion of the gases passes out of the second outlet 42 into the auxiliary duct 44. Generally, the aperture is dimensioned such that the exhaust gas stream forming the boundary layer adjacent the outer casing 36 is entrained into the auxiliary duct 44. The exhaust gas stream that flows through the auxiliary duct then flows along the auxiliary duct 44 and through the heat recovery device 46. Thermal energy from the exhaust gases is converted to either mechanical or electrical energy as the gas stream flows through the energy recovery device 46. The exhaust gas stream then flows further downstream, and is vented to the atmosphere through an auxiliary duct outlet 50.

The remainder of the exhaust gases continue to flow through the diffuser duct 28 toward the first outlet 32, and are further diffused by the secondary portion 40 of the diffuser duct 28, before being vented to the atmosphere through a further duct 52.

Figure 2:
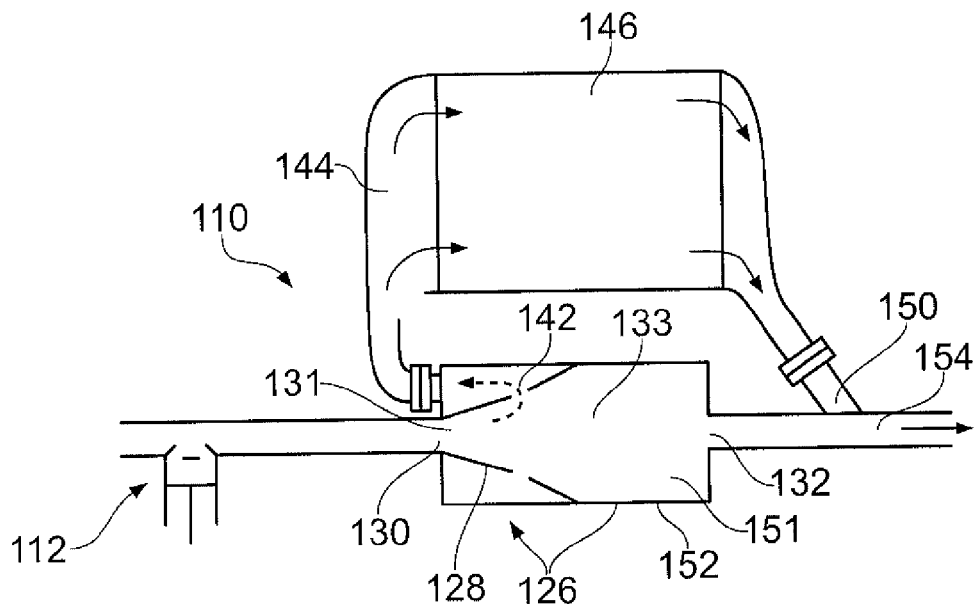
FIG. 2 is a cross sectional view of a second power generator.

FIG. 2 shows a second power generator 110 comprising an internal combustion engine in the form of a piston engine 112, and an exhaust arrangement 126.

The exhaust arrangement 126 includes an exhaust silencer 152. The exhaust silencer 152 comprises a through passage 151 defined by a cylindrical casing 126, the through passage 151 having an inlet 130 and an outlet 132. The silencer 152 includes a diffuser duct 128 located within the through passage 151.

The diffuser duct 128 diverges from the exhaust silencer inlet 130 to a first outlet 133 located upstream of the exhaust silencer outlet 132. The diffuser duct 128 further comprises a second outlet 142 located partway along the diffuser duct 128 between the inlet 130 and first outlet 133.

The second outlet leads to an auxiliary duct 144 which comprises a heat recovery device 146. Again, the heat recovery device could be of any suitable type. The auxiliary duct comprises an outlet 150, which communicates with a manifold 154 located downstream of the exhaust silencer 152.

In use, exhaust gases flow from the engine 112 into the inlet 130. The gases then flow through the diffuser 128 from the inlet 130 in the direction shown by the arrows in FIG. 2 toward the second outlet 142. As the exhaust gases flow toward the second outlet 142, the pressure of the exhaust gases relative to the pressure at the inlet 130 is increased as a result of the diverging profile of the diffuser duct 128.

A portion of the gases (again, generally the gases within the boundary layer) passes out of the second outlet 142 into the auxiliary duct 144, while the remainder flows through the remainder of the diffuser 128, to the first outlet 133. The portion of gas that flows through the second outlet 142 then flows through the heat recovery device 146, which converts some of the thermal energy in the exhaust gases to either mechanical or electrical energy. The exhaust gases in the auxiliary duct 144 then flow further downstream to the manifold 154, where they rejoin the remainder of the gases which flow through the first diffuser duct outlet 133 and silencer outlet 132.

The invention therefore provides an improved exhaust arrangement having significant advantages over prior arrangements. The exhaust arrangement can recover some of the waste heat of the exhaust gases from an internal combustion engine without substantially increasing the back pressure in the exhaust arrangement, thereby maintaining or improving the performance of the internal combustion engine. As a further benefit, the divergence angle of the diffuser duct can be increased without encountering flow separation by perhaps as much as 4°, thereby leading to a shorter length diffuser duct in comparison to prior arrangements. It is thought that the invention can also provide an overall efficiency and power output increase of around 1-2%. The arrangement can be installed on existing combustion engines with little or no modifications to the engine itself.

While the invention has been described in relation to particular embodiments, various changes may be made without departing from the scope of the invention. For example, different types of heat recovery device could be used. Features of either of the embodiments could be used on the other embodiment.

The invention claimed is:

1. An exhaust arrangement for an internal combustion engine, the exhaust arrangement comprising:
    a diffuser duct comprising an inlet, a first outlet, and a wall surface defined between the inlet and the first outlet, the wall surface having an upstream divergent portion and a downstream divergent portion; and
    an auxiliary duct having an inlet extending from a second outlet of the diffuser duct, the second outlet being located between the upstream and the downstream divergent portions, wherein
    the auxiliary duct comprises a heat recovery device configured to convert heat energy from exhaust gases passing through the auxiliary duct in use to mechanical or electrical energy.

2. An exhaust arrangement according to claim 1, wherein the auxiliary duct is arranged such that, when a fluid flows through the auxiliary duct in use, the fluid entering the auxiliary duct inlet is drawn from a boundary layer flow adjacent the wall surface.

3. An exhaust arrangement according to claim 1, wherein the auxiliary duct inlet is located at a position on the diffuser duct such that, in use, the pressure at the auxiliary duct inlet is above atmospheric pressure.

4. An exhaust arrangement according to claim 1, wherein the downstream divergent portion has a step displacement away from a projected profile of the upstream divergent portion.

5. An exhaust arrangement according to claim 1, wherein the diffuser duct has a divergence angle of between 6° and 10°.

6. An exhaust arrangement according to claim 4, wherein each of the upstream and the downstream divergent portions of the diffuser duct has a length/height ratio of approximately 4.

7. An exhaust arrangement according to claim 1, wherein the overall area ratio of the diffuser duct from the first inlet to the first outlet is approximately 2.7.

8. An exhaust arrangement according to claim 1, wherein the heat recovery device comprises a Seebeck effect heat recovery device, a heat recovery steam generator (HRSG), or a turbine.

9. A power generator comprising an internal combustion engine and an exhaust arrangement in accordance with claim 1.

10. A vehicle comprising a power generator according to claim 9.

11. An exhaust arrangement according to claim 1, wherein the diffuser duct is generally annular in shape.

12. An exhaust arrangement according to claim 1, wherein the second outlet of the diffuser duct is generally annular in shape.

13. An exhaust arrangement according to claim 1, wherein the diffuser duct and the auxiliary duct are non-coaxial.

14. An exhaust arrangement according to claim 1, wherein the second outlet of the diffuser duct is formed by a downstream end of the upstream divergent portion and an upstream end of the downstream divergent portion.

\* \* \* \* \*